United States Patent
Nishio et al.

(10) Patent No.: US 7,180,629 B1
(45) Date of Patent: Feb. 20, 2007

(54) METHODS AND APPARATUS FOR COLOR DEVICE CHARACTERIZATION

(75) Inventors: Kenichi Nishio, Kanagawa (JP); Eiji Mizutani, Hsinchu (TW)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/719,950

(22) PCT Filed: Apr. 28, 2000

(86) PCT No.: PCT/US00/11504

§ 371 (c)(1),
(2), (4) Date: Dec. 18, 2000

(87) PCT Pub. No.: WO00/65847

PCT Pub. Date: Nov. 2, 2000

(30) Foreign Application Priority Data

Apr. 28, 1999 (JP) .................................. 11-122734

(51) Int. Cl.
*H04N 1/48* (2006.01)
*H04N 1/60* (2006.01)
*H04N 5/235* (2006.01)
*H04N 9/73* (2006.01)
*G06T 1/40* (2006.01)

(52) U.S. Cl. ...................... 358/1.9; 358/509; 358/518; 348/223.1; 348/231.6; 348/234; 382/156; 382/167

(58) Field of Classification Search ................. 358/1.9, 358/509, 518, 519, 530; 382/162, 167, 155, 382/156; 348/222.1, 223.1, 231.99, 231.3, 348/231.6, 234, 238, 180, 187, 370
See application file for complete search history.

(56) References Cited

U.S. PATENT DOCUMENTS 5,018,017 A * 5/1991 Sasaki et al. ............ 348/231.3
(Continued)

FOREIGN PATENT DOCUMENTS

EP 0 720 390 A2 7/1996
(Continued)

OTHER PUBLICATIONS

Patent Abstracts of Japan, vol. 016, No. 551 (P-1453), Nov. 20, 1992, and JP 04 208928 A (Olympus Optical Co. Ltd.), Jul. 30, 1992.

*Primary Examiner*—Scott A. Rogers
(74) *Attorney, Agent, or Firm*—Oblon, Spivak, McClelland, Maier & Neustadt, P.C.

(57) ABSTRACT

Methods and apparatus for color correction of color image data obtained by an electronic camera determine a correction to data representative of the color image based upon an estimated illuminant using a neural network, multilayer perceptron models and/or coactive neuro-fuzzy inference system models, and apply the correction to the data representative of the color image. Data representative of the color corrected data may be recorded or transmitted. A method of recording image data obtained by an electronic camera captures a color image, generates data representative of the image, estimates an illuminant for the captured color image, generates data representative of the estimated illuminant and records the data representative of the image with the data representative of the estimated illuminant. A method of transmitting image data obtained by an electronic camera captures a color image, generates data representative of the image, estimates an illuminant for the captured color image, generates data representative of the estimated illuminant and transmits the data representative of the image with the data representative of the estimated illuminant.

15 Claims, 13 Drawing Sheets

U.S. PATENT DOCUMENTS 5,376,963 A    12/1994  Zortea
5,559,604 A *  9/1996  Arai ........................... 356/402
5,754,227 A *  5/1998  Fukuoka .................. 348/231.6
5,929,906 A *  7/1999  Arai et al. ............... 348/223.1

FOREIGN PATENT DOCUMENTS

EP    0 720 390 A3    7/1996

* cited by examiner

Multilayer perceptrons

METHODS AND APPARATUS FOR COLOR DEVICE CHARACTERIZATION

BACKGROUND OF THE INVENTION

1. Field of the Invention

The present invention relates to color correction of images, and in particular relates to methods and apparatus for color device characterization, correcting color of a color image obtained by an electronic camera, transmission of color corrected data and a recording medium having recorded thereon a color corrected data of a color image.

2. Description of the Related Art

There are known in the art two approaches for performing color correction for an image captured by an electronic color camera. A first approach is to directly convert the camera's output data into the same color space as camera's output color space with improved color accuracy. For instance, when the camera's output space is YUV (defined below), the color correction model's input and output spaces are YUV, but with higher color accuracy at the output YUV. Hereinafter, this approach will be referred to as "device specific color correction." "YUV" is a color representation which is typically used in connection with video transmission. "Y" represents luminance, "U" represents a component of colors corresponding approximately to blue minus yellow, while "V" represents component of colors corresponding approximately to red minus cyan. Other color representations include "RGB" (red, green blue) and "YCC" where YCC indicates any color space consisting of one luminance factor and two chrominance factors. The above-described YUV is one example of a YCC color representation. YIQ, is another example of a YCC color representation, where "I" is a component of colors corresponding approximately to yellowish red minus light blue, while "Q" is a component of colors corresponding approximately to violet minus greenish yellow. YCbCr (luminance, chrominance-blue, chrominance-red is yet another example of a YCC color representation.

A second approach for color correction is divided into two steps. First, the camera's output color space is once converted into a calorimetric space (XYZ or L*a*b*), the space which is specified by CIE (International Illumination Committee, originally published in the French language). A calorimetric color space attempts to describe color of natural objects perceived by human eyes. Color data described in a calorimetric space corresponds to the original color of the images taken by an electronic color camera. In a second step, the color data converted into such a colorimetric space is then converted into an output device's (computer monitor or printer) specific color space, where the entire image path can provide calorimetrically correct color reproduction. This two-step concept is incorporated in the ICC (International Color Committee) color profile format, which is commonly used in computer image processing where relatively high accuracy is required in color reproduction. In the context of the color correction based on ICC's concept, the intermediate calorimetric space is often referred to as a "device independent color space." Therefore, this color correction approach is referred to as "device independent color correction."

To perform the above-described device-independent color correction, one should attempt to determine an inverse function of a camera's color transformation. This step is called "color device characterization" for an electronic camera, and such characterization is employed to correct color of images obtained by the electronic camera. The conventional practice for determining the inverse function of an electronic camera's color transformation is to apply a method widely used for determining an inverse function of image scanners' color transformation. This approach has been considered reasonable, because most color cameras have signal processing similar to that of image scanners.

FIG. 1 shows the signal-processing diagram that is used in both image scanners and most electronic color cameras. In FIG. 1, input data of image sensor 104 of camera 100 is assumed to be in calorimetric space XYZ, which is provided to inputs 101, 102 and 103, respectively. The output space of image sensor 104 is RGB, while the camera's output space is YCC. Camera output is provided at outputs 110, 111, and 112, corresponding to Y, C and C, respectively.

A simple reverse-model, shown in FIG. 2, can be used to approximate the inverse function of the color transformation formed by the image sensor camera 100 shown in FIG. 1. In FIG. 2, each block should perform inverse conversion of corresponding blocks in FIG. 1. The pairs of corresponding blocks are 104–124, 151–161, 152–162, 153–163 and 109–122. Specifically, matrices 104 and 109 should be inverse matrices of 124 and 122 respectively. Tone reproduction curves ("TRCs"), which are usually implemented by one-dimensional lookup tables ("1D-LUTs") 151, 152, and 153, should be inverse functions of 1D-LUTs 161, 162 and 163, respectively. Since this color correction model consists of matrices and TRCs, it is called a "TRC-matrix model."

As shown in FIGS. 1 and 2, the color transformation of image sensor 104 is linearly approximated by a 3×3 matrix 124. According to color science for electronic cameras, an image sensor's spectral analysis characteristics ideally should be a linear combinations of color matching functions xyz specified by CIE, that is, a set of spectral functions which represent human eye's color sensitivity. Since all color cameras are designed to target these ideal characteristics, in many cases a 3×3 matrix can well approximate an image sensor used in electronic cameras, thereby providing a reasonably accurate inverse function of the camera's color transformation. This TRC-matrix model approach, however, cannot perform an accurate color correction under some circumstances.

Approximation Accuracy

When an image sensor's color transformation cannot be well approximated by a 3×3 matrix in the TRC-matrix model (124 in FIG. 2), color correction cannot be accurate. This situation can likely occur in many entry-level electronic cameras. This is also the case when the camera's signal processing does not match the configuration shown in FIG. 1, such that the configuration of FIG. 2 can no longer be a reverse model of the camera. For instance, FIG. 3 is a block diagram which illustrates signal processing typically used in a CMYG (Cyan, Magenta, Yellow, and Green, also referred to as "complementary color") electronic color camera. At first glance, FIG. 2 cannot work as a reverse model for the signal processing of FIG. 3. In addition, it is not easy to construct a simple reverse model for the signal processing performed by the system of FIG. 3, due to structural complexity of a CMYG camera's signal processing.

Illuminant Dependency

In the case of an electronic camera, whether it be a still camera or one intended to record a succession of still or moving images, there is a somewhat unique problem, more specifically, that of illuminant dependency of color transformation. While an image scanner captures images using one fixed built-in illuminant all the time, an electronic camera captures images under a variety of illuminants, for example, outdoors at dawn, mid-day or late afternoon, indoors with fluorescent, incandescent or other types of artificial lighting, a combination of artificial lighting, or even a combination of natural (outdoor) and artificial lighting. In an electronic camera, there is a mechanism to estimate the illuminant at the time of image capturing, wherein the camera's gain settings at R, G, and B channels are adjusted according to the on-camera illuminant estimation, so that the final output image has R=G=B with respect to a white object. This operation is called "white balancing," and the gain adjustment is placed between image sensor 104 and 1D-LUTs 105 in FIG. 1, although it is not shown in the diagram. Usually, color transformation of a camera changes depending on the setting of white balancing. In other words, an electronic camera has illuminant dependency in its color transformation. It means color distortion or error caused by an electronic camera changes depending on illuminant. Therefore, for highly accurate color correction, it is necessary to prepare for inverse functions of the camera's color transformation under all possible illuminants, which is impractical. One existing solution for this problem is to prepare for a set of inverse functions (likely in a form of ICC color profile, using either a TRC-matrix model or a three-dimensional lookup table) of color transformation under several representative illuminants. A user then has to manually select from the set of preset inverse functions, considering which inverse function is the best fit to the illumination under which the user actually captured the image. This not only is a burden for the user, but also can result in inaccurate color correction if the user's selection is inappropriate. Furthermore, inaccurate correction can also occur when the actual illumination used for the image capture falls between the preset inverse functions. This is a limitation of the lookup-table based (TRC-matrix) method. Another limitation of the look-up table based method is its inability to accurately correct color under multi-illuminant conditions. An alternative to the TRC-matrix method is the three dimensional lookup table ("3D-LUT"). Although such a 3D-LUT is more accurate than the TRC-matrix, the size of the correction model is huge, and it is, as with the TRC-matrix method, incapable of accurately correcting color under multi-illuminant conditions. Thus, it would be desirable to provide a method and apparatus for accurately correcting the color of images taken by an electronic camera under arbitrary illuminants.

SUMMARY OF THE INVENTION

It is an object of the invention to provide a method and apparatus for correcting the color of images obtained by an electronic camera under a variety of illuminants.

It is also an object of the invention to provide a method and apparatus for characterizing a color device.

It is an additional object of the invention to provide a method and apparatus for correcting the color of images obtained by an electronic camera under a combination of illuminants.

It is yet another object of the invention to provide a recording medium having recorded thereon data representative of color corrected color images.

It is yet an additional object of the invention to provide a method of transmitting data representative of color corrected color images.

It is a feature of the invention to correct color of a color image by utilizing a neural network as a function approximator to overcome the limitations of the look-up table method in determining a correction to data representative of the color image.

It is a feature of the invention to correct color of a color image by utilizing a multilayer perceptron ("MLP"), a form of neural network, to determine a correction to data representative of the color image.

It is yet another feature of the invention to correct color of a color image by utilizing a coactive neuro-fuzzy inference system ("CANFIS") model to determine a correction to data representative of the color image.

It is yet a further feature of the invention to perform an automatic color correction of a color image obtained by an electronic camera in the case of multi-illuminant conditions.

It is yet another feature of the invention to convert image data into XYZ space, thereby providing better accuracy in white point and in color under sophisticated off-camera illumination estimation.

It is yet an additional feature of the invention to easily realize color constancy by modifying or replacing a training data set.

It is an advantage of the invention to a higher color correction accuracy of images obtained by an electronic camera than is generally possible with a conventional TRC-matrix.

It is a further advantage of the invention to allow electronic camera users to concentrate on composition instead of spending time on color correction during a photo shoot, but also at the time of displaying and/or printing a photo.

According to one aspect of the invention, there is provided a method of correcting color of a color image obtained by an electronic camera, comprising the steps of determining, using a neural network, a correction to data representative of the color image based upon an estimated illuminant of the color image; and applying the correction to the data representative of the color image, wherein the illuminant comprises multiple sources of illumination.

According to another aspect of the invention, there is provided a method of correcting color of a color image obtained by an electronic camera, comprising the steps of determining, using a multilayer perceptron model, a correction to data representative of the color image based upon an estimated illuminant of the color image; and applying the correction to the data representative of the color image, wherein the illuminant comprises multiple sources of illumination.

According to a further aspect of the invention, there is provided a method of correcting color of a color image obtained by an electronic camera, comprising the steps of determining, using a coactive neuro-fuzzy inference system model, a correction to data representative of the color image based upon an estimated illuminant of the color image; and applying the correction to the data representative of the color image, wherein the illuminant comprises multiple sources of illumination.

According to yet another aspect of the invention, there is provided an apparatus for correcting color of a color image obtained by an electronic camera, comprising a neural network for determining a correction to data representative of the color image based upon an estimated illuminant of the color image and for applying the correction to the data representative of the color image, wherein the illuminant comprises multiple sources of illumination.

According to yet a further aspect of the invention, there is provided an apparatus for correcting color of a color image obtained by an electronic camera, comprising a multilayer perceptron model for determining a correction to data representative of the color image based upon an estimated illuminant of the color image, and for applying the correction to the data representative of the color image, wherein the illuminant comprises multiple sources of illumination.

According to another aspect of the invention, there is provided an apparatus for correcting color of a color image obtained by an electronic camera, comprising: a coactive neuro-fuzzy inference system model for determining a correction to data representative of the color image based upon an estimated illuminant of the color image, and for applying the correction to the data representative of the color image, wherein the illuminant comprises multiple sources of illumination.

According to a further aspect of the invention, there is provided a recording medium having recorded thereon color corrected data of a color image obtained by an electronic camera, the recording medium being prepared by the steps of determining, using a neural network, a correction to data representative of the color image based upon an estimated illuminant of the color image; applying the correction to the data representative of the color image, wherein the illuminant comprises multiple sources of illumination; and recording on the recording medium data representative of the corrected data.

According to yet another aspect of the invention, there is provided a recording medium having recorded thereon color corrected data of a color image obtained by an electronic camera, the recording medium being prepared by the steps of determining, using a multilayer perceptron model, a correction to data representative of the color image based upon an estimated illuminant of the color image; applying the correction to the data representative of the color image, wherein the illuminant comprises multiple sources of illumination; and recording on the recording medium data representative of the corrected data.

According to yet another aspect of the present invention, there is provided a recording medium having recorded thereon color corrected data of a color image obtained by an electronic camera, the recording medium being prepared by the steps of determining, using a coactive neuro-fuzzy inference system model, a correction to data representative of the color image based upon an estimated illuminant of the color image; applying the correction to the data representative of the color image, wherein the illuminant comprises multiple sources of illumination; and recording on the recording medium data representative of the corrected data.

According to an aspect of the invention, there is provided a method of transmitting color corrected data of a color image obtained by an electronic camera, comprising the steps of determining, using a neural network, a correction to data representative of the color image based upon an estimated illuminant of the color image; applying the correction to the data representative of the color image, wherein the illuminant comprises multiple sources of illumination; and transmitting data representative of the corrected data.

According to another aspect of the invention, there is provided a method of transmitting color corrected data of a color image obtained by an electronic camera, comprising the steps of: determining, using a multilayer perceptron model, a correction to data representative of the color image based upon an estimated illuminant of the color image; applying the correction to the data representative of the color image, wherein the illuminant comprises multiple sources of illumination; and transmitting data representative of the corrected data.

According to a further aspect of the invention, there is provided a method of transmitting color corrected data of a color image obtained by an electronic camera, comprising the steps of: determining, using a coactive neuro-fuzzy inference system model, a correction to data representative of the color image based upon an estimated illuminant of the color image; applying the correction to the data representative of the color image, wherein the illuminant comprises multiple sources of illumination; and transmitting data representative of the corrected data.

According to an aspect of the invention, there is provided a method of recording image data obtained by an electronic camera, comprising the steps of: capturing a color image and generating data representative of the image; estimating an illuminant for the captured color image and generating data representative of the estimated illuminant; and recording the data representative of the image with the data representative of the estimated illuminant.

According to a further aspect of the invention, there is a provided a method of transmitting image data obtained by an electronic camera, comprising the steps of: capturing a color image and generating data representative of the image; estimating an illuminant for the captured color image and generating data representative of the estimated illuminant; and transmitting the data representative of the image with the data representative of the estimated illuminant.

These and other objects, features and advantages will become apparent when considered with reference to the following description and the accompanying drawings.

DETAILED DESCRIPTION OF THE PREFERRED EMBODIMENTS

To solve the problems described above, a neural network (e.g., a MLP) or a CANFIS neuro-fuzzy model is utilized. Although the invention is applicable to both "device specific" and "device independent" approaches, the embodiments disclosed herein are described herein in relation to device independent color correction. It is to be understood that a MLP is just one type of well known neural network. Furthermore, where a neural network is specified in herein, a MLP or other type of neural network may be utilized.

A Single-Illuminant Color Correction Using an MLP.

Figure 4A:
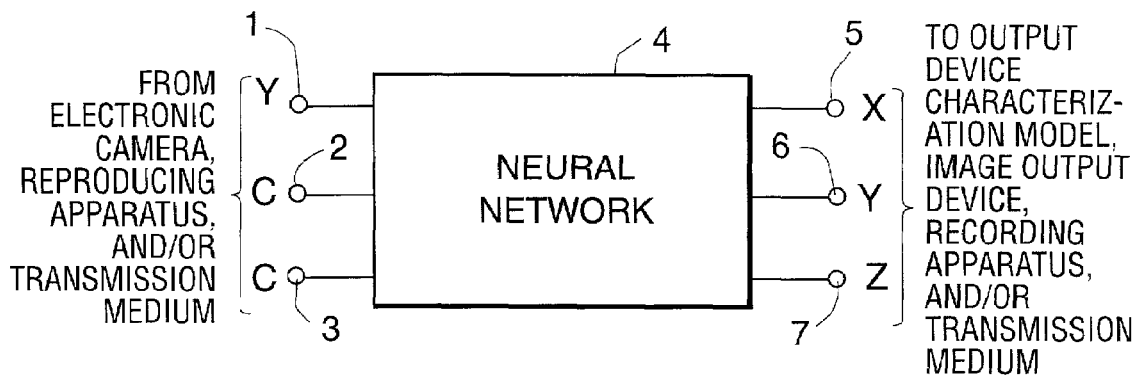
FIG. 4A is a block diagram of an embodiment of a color correcting apparatus of the present invention in which a neural network is utilized to generate an inverse function (or mapping) of an electronic camera's color transformation.
Figure 4B:
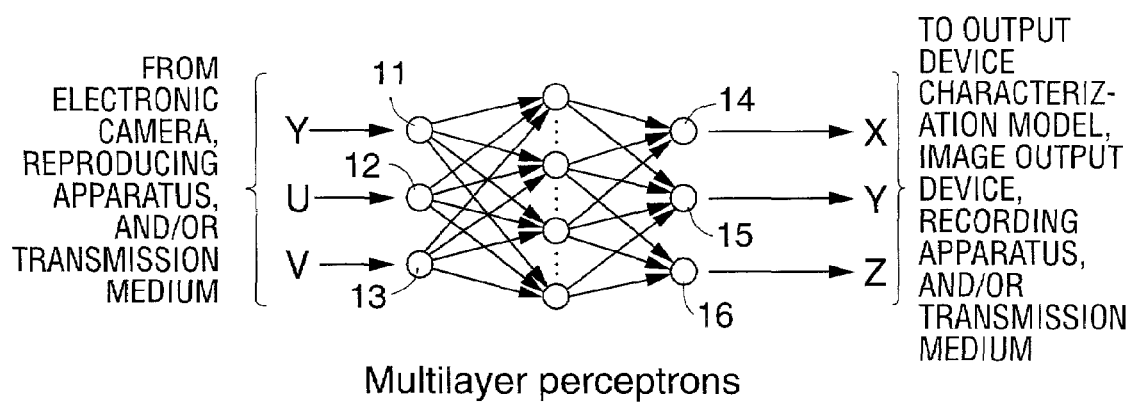
FIG. 4B is a diagram of an embodiment of a color correcting apparatus of the present invention in which multilayer perceptrons are utilized to generate an inverse function (or mapping) of an electronic camera's color transformation.

As discussed above, when a color correction using a TRC-matrix model (FIG. 1) cannot be accurate even under one fixed known illuminant, the cause is likely to be non-ideality, nonlinearity or structural complexity in the electronic camera. A neural network as shown in FIG. 4A or a MLP model as shown in FIG. 4B can be used instead of the TRC-matrix model to improve the correction accuracy. In FIG. 4A any neural network may be utilized, for example, the MLP of FIG. 4b. With the neural network (e.g., MLP) model, the correction can be based on one fixed illuminant, thus hereinafter referred to as "single-illuminant" color correction. A color correction model using a neural network (e.g., MLP) had been used only for imaging devices such as printers, whose color transformation is highly nonlinear and whose white point (corresponding to the color of illumination in case of an electronic camera) is considered fixed.

A Y input 1, a C input 2 and a C input 3 provide image data to neural network 4 as shown in FIG. 4A. Image data is provided from an electronic camera. Alternatively, image data may be provided to inputs 1, 2 and 3 from a reproducing apparatus and/or a transmission medium. In the latter instances, since illumination information necessary for color correction is only available from the electronic camera, such illumination information should be recorded and/or transmitted with the image data, or should otherwise be provided to the neural network 4. In the case of transmission or recording of image data from an electronic camera, many image data formats include unused fields or spaces for use by image printers. Such fields or spaces are typically available to record the date of a photo shoot, a camera model designation or a camera manufacturer designation. Therefore, one or more unused field or space may be allocated to illumination information, such that the image data is recorded and/or transmitted together with the illumination information, but before any color correction has been applied to the image data.

The neural network 4 provides an X output 5, a Y output 6 and a Z output 7 in the calorimetric space XYZ. As shown in FIG. 4B, the MLP has three input nodes, Y, U and V, designated by reference numerals 11, 12 and 13, respectively, for camera's output values (RGB or YCC). The MLP also has three output nodes X, Y and Z, designated by reference numerals 14, 15 and 16, respectively. Output nodes X, Y and Z provide either colorimetric values (XYZ or L*a*b*) for device-independent color correction, or target output values in RGB or YCC for device-specific color correction. These calorimetric or color-corrected output values may be provided to image output devices, such as printers or display monitors, via the output device's characterization model. The values may also be directly provided to image output devices. Alternatively, these values, encoded and/or compressed versions thereof, may be recorded by a recording apparatus onto a recording medium such as a magnetic disc, an optical disc, a magneto-optical disc, or a sold state memory, or may be transmitted through a transmission medium such as the Internet, telephone lines, dedicated lines, radio frequency or an optical medium.

For optimizing an MLP's parameters, a set of input-output samples, called a "training" data set, is prepared that includes representative color samples, pairs of inputs YUV and desired outputs XYZ. Then a given task is formulated as a nonlinear least squares problem, in which, the objective is to optimize an MLP's parameters by minimizing a squared error measure between the desired outputs and the model's outputs. The objective function E(.), the squared error measure, can be expressed by residual vectors $r(\theta)$ as:

$$E(\theta)=(1/2)r^T(\theta)r(\theta)$$

The parameter optimization is carried out iteratively with the aim of eventually making the model reproduce the desired outputs. This iterative process is referred to as "training" (or "learning") in the neural network literature.

Besides the "training" data set, an MLP's approximation capacity is often measured by using a different data set, called a "checking" data set, which is not employed for parameter adjustment. One important advantage of neural networks, and in particular, those of an MLP, are the results obtained for input data outside of the training data set.

In the posed "device-independent" color correction problem, the MLP is trained to form a mapping from a camera's response signals (e.g., RGB or YCC) to colorimetric values (e.g., XYZ or L*a*b*). In the "device-specific" color correction problem, the MLP's desired mapping is from error-corrupted camera's response signals (RGB or YCC) to their associated corrected RGB or YCC signals. In any event, those input-output samples are collected by using the standard Macbeth ColorChecker or Munsell color patches, which are evenly distributed in the entire color space.

Note that if the data are collected under a certain single illuminant, then the task becomes the so-called single-illuminant problem, which is ubiquitous in color correction for images captured by image scanners.

Multi-Illuminant Color Correction Using an MLP

Figure 5:
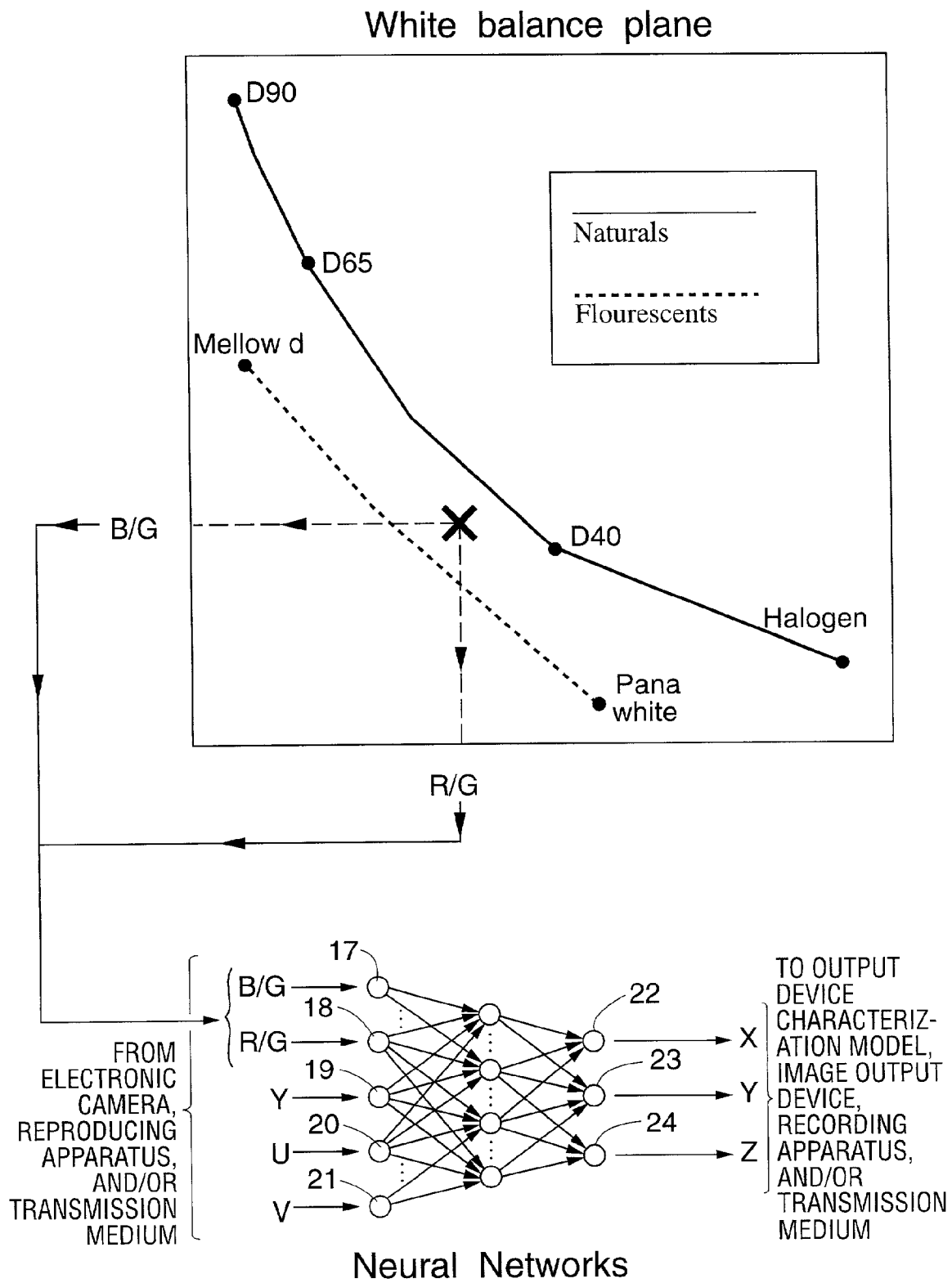
FIG. 5 is a diagram of an embodiment of a color correcting apparatus of the present invention in which single multilayer perceptron are utilized to generate a color corrected output space converted image.
Figure 13:
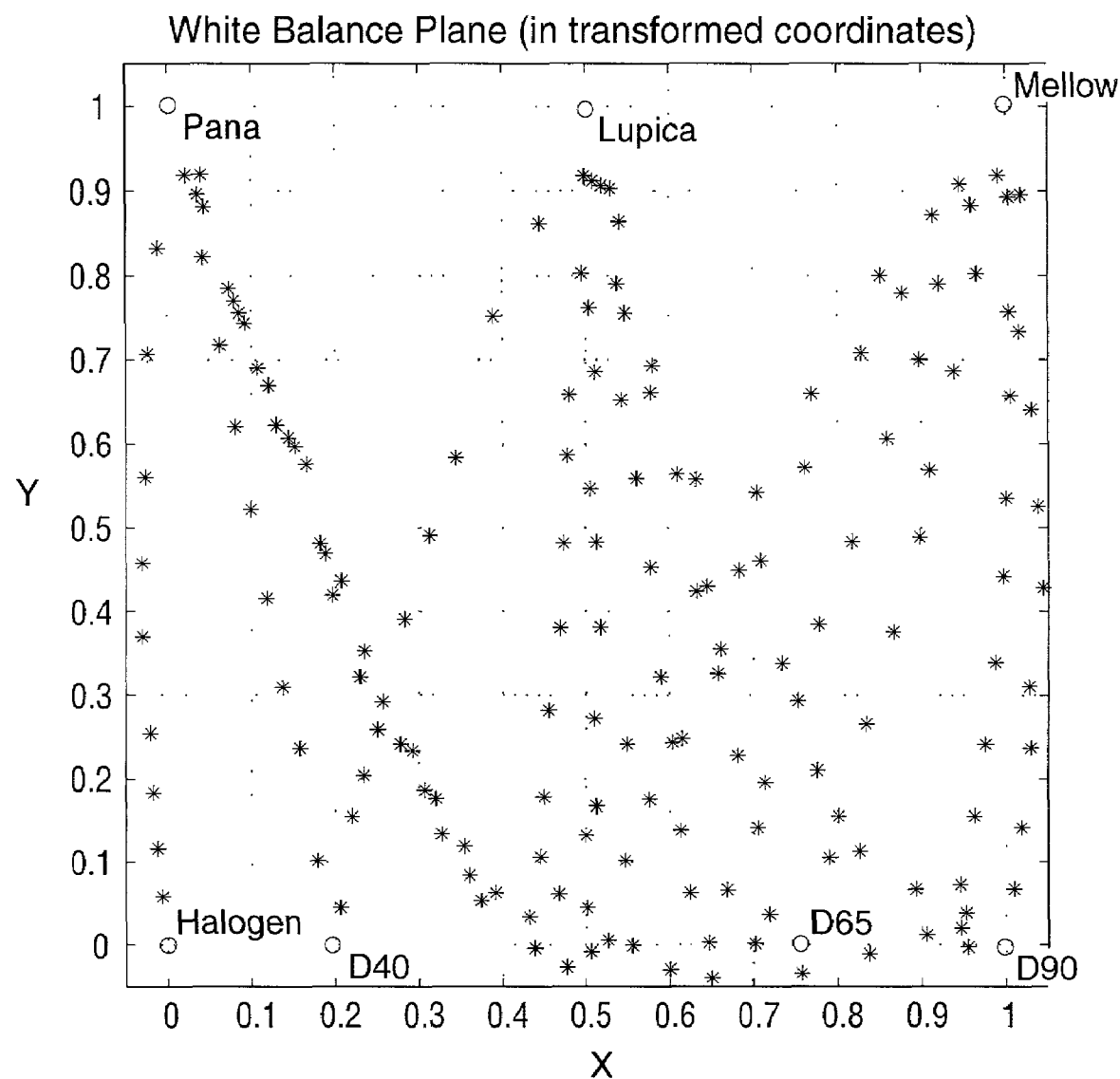
FIG. 13 illustrates a neural network transformed distribution on transformed coordinates of the white balance plane.

Referring now to FIG. 5, an MLP model is used to achieve an automatic color correction for images captured by an electronic camera under arbitrary illuminant (at the time of image capture). The MLP model is trained so that it automatically adjusts its mapping, an inverse function of the camera in a case of device-independent correction, depending on the illuminant used at the time of image capture. This is hereinafter referred to as "multi-illuminant" color correction. Since it is difficult to exactly know what illuminant was used at the time of image capture, the model instead takes advantage of the electronic camera's on-camera illumination estimation data (or white balancing data), R/G and B/G values for instance, where R, G, and B are measured signal values for illumination color, as illustrated in the upper portion of FIG. 5. In FIG. 5 "Pana white" refers to a trademark for a "white" flourescent bulb sold in Japan by Matsushita Electric Industrial Co. Ltd. of Osaka, Japan. "Mellow d" refers to a trademark which identifies a "daylight" type of flourescent bulb sold in Japan by Toshiba Lighting & Technology Co. of Tokyo, Japan. It is to be understood that FIG. 13 can be used in place of the upper portion of FIG. 5 (White balance plane)

The MLP used for the multi-illuminant color correction should have additional nodes to input the illumination information. For instance, two additional input nodes can be used because illumination chromaticity can be described by a set of two values. Consequently, the MLP model for this task has five input nodes B/G, R/G, Y, U and V, designated by reference numbers 17, 18, 19, 20 and 21, respectively, and three output nodes X, Y and Z, designated by reference numerals 22, 23 and 24, respectively, as shown in FIG. 5. The outputs X, Y and Z, or transformed, normalized, encoded and/or compressed versions thereof, may be recorded by a recording apparatus onto a recording medium such as magnetic disc, an optical disc, a magneto-optical disc, or a solid state memory or may be transmitted through a transmission medium such as the Internet, telephone lines, dedicated lines, radio frequency or an optical medium.

In accordance with one embodiment of the invention, the following steps are taken to train a multi-illuminant color correction model:

(1) Measure an electronic camera's output values and colorimetric values (for device-independent correction) of a set of color samples under several representative illuminants. The total size of training data set is therefore N*M, where N is the number of color samples and M is the number of representative illuminants under consideration.

(2) For each illuminant, measure gain data of the RGB channels as applied to balance white, or instead, measure signal values of RGB channels for illuminant color.

(3) Convert the measured three values onto a set of two chromaticity values, for instance, R/G and B/G. The data may be further processed to better characterize the illuminant information, as described below with respect to a method for constructing fuzzy membership functions for the CANFIS neuro-fuzzy model.

(4) An MLP is trained using the data set (1), as described above. At the same time, the data set (3), that is, the illuminant information under which data (1) is measured, are provided to the input nodes 17 (B/G) and 18 (R/G).

After the above described steps have been completed, the MLP model outputs the original scene's calorimetric values by having camera's output values and the illuminant information at its input. The camera's illuminant dependency of color transformation is automatically compensated by referring to the illumination information. When the illuminant actually used at the time or times of image capture does not coincide to any of the representative illuminants used for the MLP training, the MLP automatically approximates the inverse function of the camera's color transformation between illuminants.

Method for Training MLP Models

Due to the nonlinearity of MLPs, an efficient iterative method is desirable for solving the NN nonlinear least squares problem posed in above section. Numerical tests have revealed that a dogleg trust-region implementation of the Levenberg-Marquardt-type algorithm is suitable for the problem to be solved. In further detail, dogleg methods produce an efficient piecewise linear approximation of the restricted Levenberg-Marquardt step within the trust region.

Figure 6A:
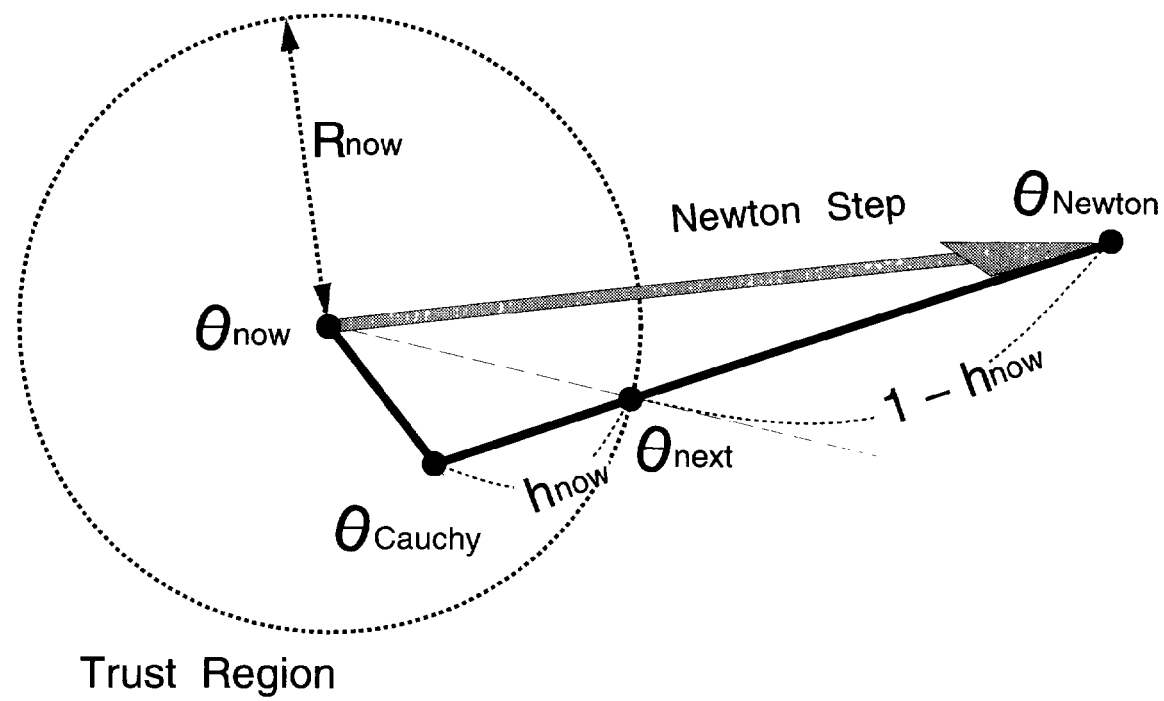
FIG. 6A is an illustration of a dogleg trajectory having a piecewise linear curve determined by the Cauchy step and the Newton step, connecting $\theta_{now}$ and $\theta_{Newton}$ by the route through $\theta_{Cauchy}$.
Figure 6B:
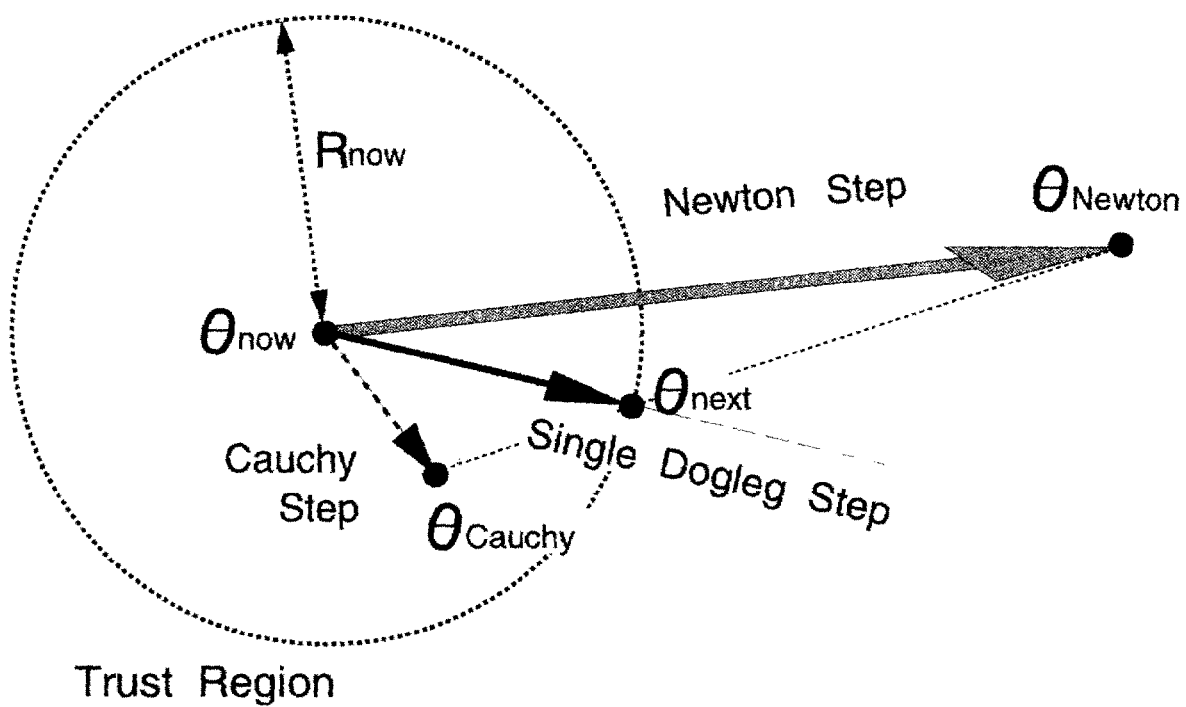
FIG. 6B is an illustration of a dogleg step which leads to $\theta_{next}$, where the dogleg step is a piecewise linear approximation to a restricted Levenberg-Marquardt step within the trust region.

FIGS. 6A and 6B illustrate how the dogleg step approximates the trust region step over a two dimensional subspace spanned by the Cauchy step and the Newton (or Gauss-Newton) step. The crosspoint between the piecewise linear dogleg trajectory (highlighted in FIG. 6A) and the trust-region boundary yields one of the next three steps:

1. Restricted Cauchy Step:

$$S_{RC} \stackrel{def}{=} -R_{now}\frac{g_{now}}{\|g_{now}\|}$$

when the trust radius $R_{now}$ is smaller than the length of the Cauchy step $S_{Cauchy}$, which is given by $$S_{Cauchy} \stackrel{def}{=} -\frac{g_{now}^T g_{now}}{g_{now}^T H_{now} g_{now}} g_{now}$$

where g and H denote the gradient vector and the Hessian matrix, respectively.

2. Newton Step:

$$S_{Newton} \stackrel{def}{=} -H_{now}^{-1} g_{now}$$

when the trust radius is larger than or equal to the length of the Newton step.

3. Dogleg Step:

$$S_{Dogleg} \stackrel{def}{=} S_{Cauchy} + h_{now}(S_{Newton} - S_{Cauchy})$$

when the trust radius is in between the Cauchy step and the Newton step. One of those steps is employed at each iteration for optimizing the model by the iterative scheme:

$$\theta_{next} = \theta_{now} + \eta d,$$

where d is a direction vector and η is some positive step size regulating to what extent to proceed in that direction. The parameter h in FIG. 6A can be determined in a straightforward calculation:

$$h_{now} = \frac{R_{now}^2 - S_{Cauchy}^T S_{Cauchy}}{(S_{Newton} - S_{Cauchy})^2 S_{Cauchy} + \sqrt{p_{now}}}$$

where $$p_{now} = (S_{Newton} - S_{Cauchy})^T (S_{Newton} - S_{Cauchy})R_{now}^2 + (S_{Newton}^T S_{Cauchy})^2 - (S_{Newton}^T S_{Newton})(S_{Cauchy}^T S_{Cauchy})$$

The power of the dogleg trust-region strategy resides in ease for a smooth transition between the steepest descent method (global convergence property) and Newton's method (fast local convergence property), making the algorithm very robust. For instance, when a next step is not satisfactory, the dogleg algorithm shortens the step length and deflects it towards the steepest descent direction simultaneously and efficiently based on a simple trust-region control.

Table 1 below compares the convergence speed of three representative nonlinear optimization algorithms in a single-illuminant (D65-illuminant) problem:

TABLE 1

|  | 25 training data | 51 checking data | Stopped epoch |
| --- | --- | --- | --- |
| 1D-lookup table with a 3 × 3 matrix transformation | 0.015900 | 0.025576 | N/A |
| MLP with 7 hidden units by steepest descent-based pattern-by-pattern learning | 0.005792 | 0.016862 | 1,000,000 (10,818.61 sec.) |
| MLP with 10 hidden units by steepest descent-based pattern-by-pattern learning | 0.004608 | 0.015991 | 1,000,000 |
| MLP with 7 hidden units by Polak-Ribiere conjugate gradient batch learning | 0.005797 | 0.018310 | 2,400 (114.65 sec.) |
| MLP with 10 hidden units by Polak-Ribiere conjugate gradient batch learning | 0.004519 | 0.016344 | 2,000 |
| MLP with 7 hidden units by a dogleg-driven Levenberg-Marquardt learning | 0.00552 | 0.017947 | 44 (8.54 sec.) |

The performance comparison is in root mean squared error of scaled XYZ values between the TRC-matrix oriented model and the MLP models with three representative learning algorithms. Note in the last column "Stopped epoch" that the required execution time (in seconds) is shown parenthesized only the for (3×7×3) MLP models with seven hidden units. From Table 1 it is clear that for a single-illuminant color correction problem, the use of the dogleg driven Levenberg-Marquardt converges faster than the other tested learning techniques indicated in Table 1. Such performance comparison is further discussed in *Color device characterization of electronic cameras by solving adaptive networks nonlinear least squares problems*, Eiji Mizutani (a co-inventor of the present application), Kenichi Nishio (the other co-inventor of the present application), Naoya Katoh and Michael Blasgen, 8th IEEE International Conference on Fuzzy Systems (FUZZ-IEEE '99), Seoul, Korea, Aug. 22–25, 1999, which paper and the figures therein are hereby incorporated by reference. Furthermore, the dogleg trust-region algorithms are further discussed in *Computing Powell's Dogleg Steps for Solving Adaptive Networks Nonlinear Least-Squares Problems*, Eiji Mizutani (a co-inventor of the present application), 8th International Fuzzy Systems Association World Congress (IFSA '99), Hsinchu, Taiwan, Aug. 17–20, 1999, and in *Powell's dogleg trust-region steps with the quasi-Newton augmented Hessian for neural nonlinear least-squares learning*, Eiji Mizutani (a co-inventor of the present application), The IEEE International Conference on Neural Networks, Washington D.C., July 10–16, 1999, both of which papers and the figures therein are hereby incorporated by reference.

Figure 7:
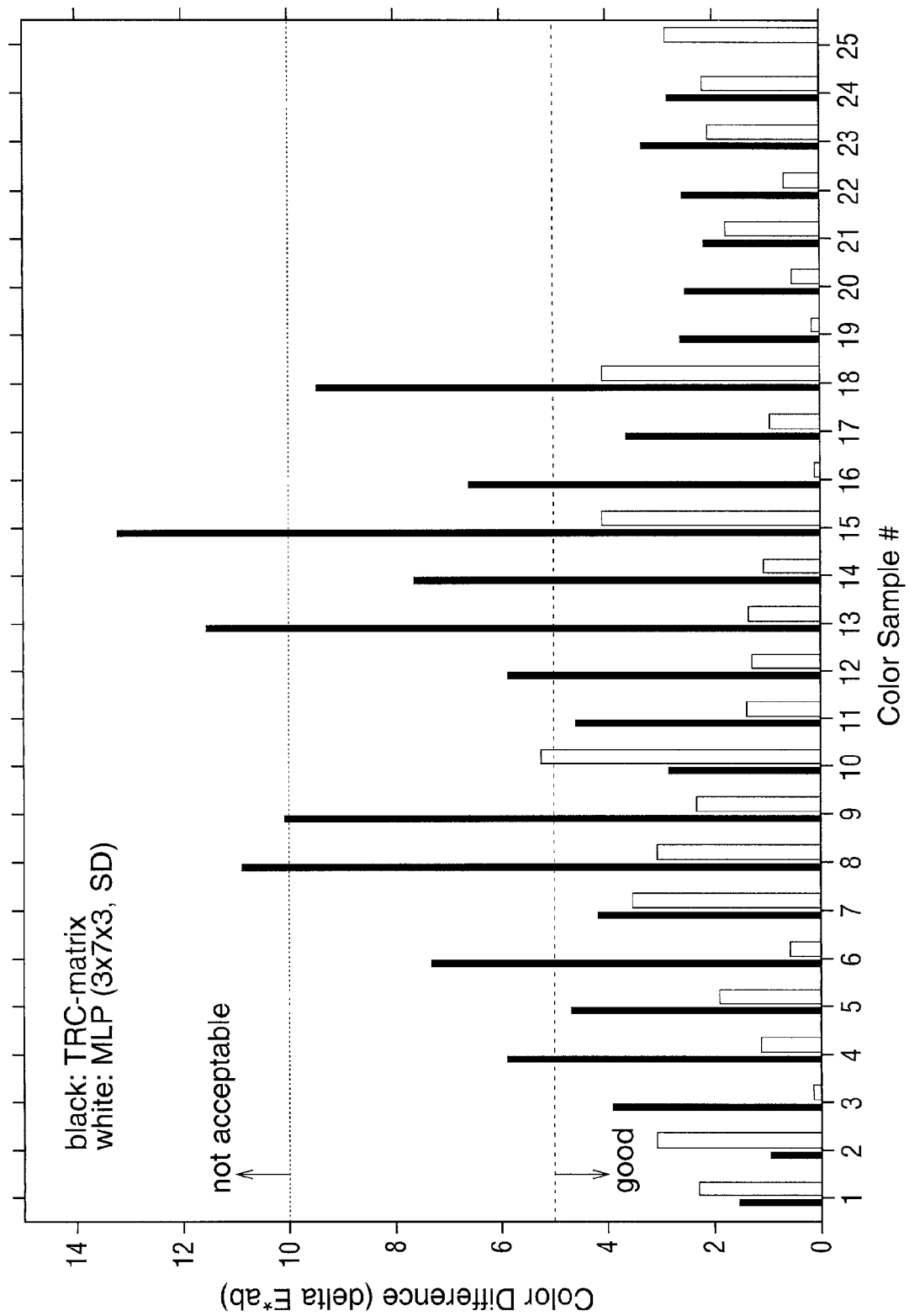
FIG. 7 is a graph which illustrates a comparison in color difference under a D65-illuminant between a single multilayer perceptron approach and a conventional look-up-table based (TRC-matrix) approach.

Referring now to FIG. 7, such Figure illustrates a comparison in color difference under a D65 illuminant between a single MLP approach and a conventional look-up table based (TRC-matrix) approach. Note that all 25 color differences (for 24 Macbeth color checkers and a "perfect-black" color sample) must be smaller than
10. FIG. 7 clearly illustrates an MLP based method effectively reduces the color difference down below an upper-limit threshold value (set equal to 10) for all 25 color samples under the D65 illuminant, whereas a conventional look-up-table based (TRC matrix) method failed to do so.

Multi-Illuminant Color Correction Using a CANFIS Neuro-Fuzzy Model

A CANFIS neuro-fuzzy model is specially designed to perform automatic "multi-illuminant" color correction based on problem-specific knowledge, which is represented by a collection of fuzzy if-then rules: In particular, "IF-part" is expressed by fuzzy membership functions (MFs) and "THEN-part" is constructed by local-expert MLPs. This is the so-called "CANFIS with neural rules" model.

Figure 8:
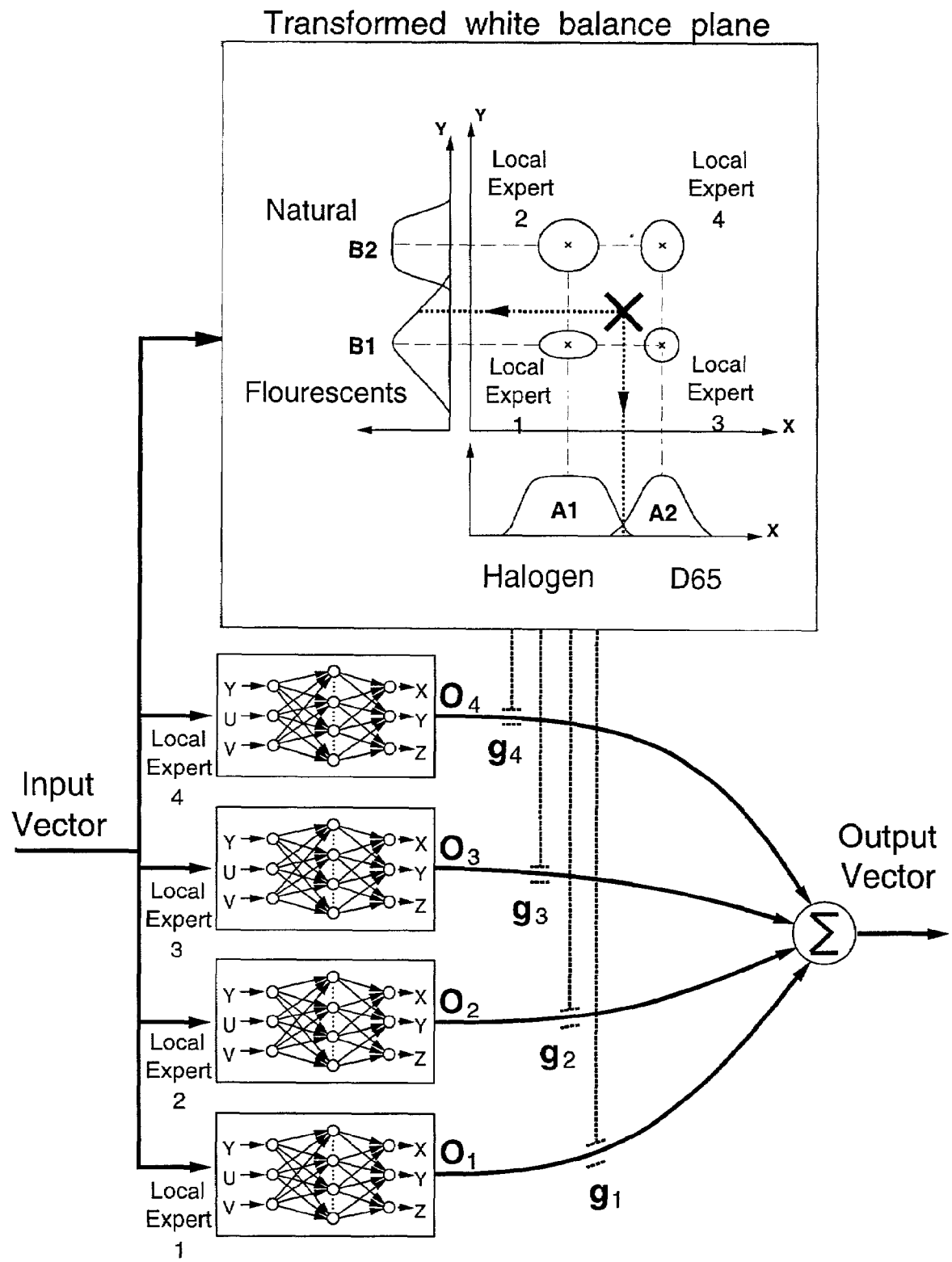
FIG. 8 is a diagram of the architecture of a CANFIS neuro-fuzzy model of the present invention.

In particular, four fuzzy rules are specified in accordance with fuzzy-partitioning on the two-dimensional transformed white balance plane, as explained below in relation to a method for constructing fuzzy membership functions. The resulting CANFIS neuro-fuzzy model consists of four fuzzy MFs (two for each axis) and four associated local-expert MLPs, as illustrated in FIG. 8. The input vector is split into two vectors for IF-part (MFs) and THEN-part (MLPs):

1. Two inputs of on-camera illumination information fed into fuzzy MFs;
2. Three inputs of camera's output signals (e.g., YUV) fed into local-expert MLPs.

The CANFIS model computes a weighted sum of the outputs of local-expert MLPs as the final output vector A (e.g., X, Y, Z color signals) by $$A = \sum_{i=1}^{4} g_i O_i$$

where $g_i$ and $O_i$ are the i-th firing strength and the i-th MLP's output vector, respectively. Each firing strength, given by the product of IF-part MF outputs, represents the extent to which the associated THEN-part MLP affects the final output. In this context, a set of IF-part MFs plays a role as an integrating unit that combines the outputs of fired THEN-part MLPs.

Usually, the integrating unit is composed of bell-shaped differentiable fuzzy MFs and their neighboring MFs are set up to have sufficient overlap. Hence, all of the associated local-expert MLPs function complementarily to generate the final output in the equation for the value of A. On the other hand, if the integrating unit is constructed by non-overlapped rectangular MFs resulting in a switching unit, then only a single local-expert MLP contributes to the final output. Only one of the $g_i$ values becomes a "unit" with all of the others being "zero." Such a single non-zero $g_i$ is associated with the i-th "fired" local expert MLP. In other words, local expert MLPs function competitively rather than complementarily. Stated differently, the CANFIS concept basically resides in the synergism among fuzzy MFs and local-expert MLPs, ruling out such an extreme switching case.

The CANFIS model has an advantage in that without increasing the number of fuzzy MFs (so that fuzzy rules can be held to meaningful limits), the model can increase learning capacity just by applying an appropriate architectural or algorithmic modification solely to the local-expert MLPs. For instance, such modification can simply adjust the number of MLP hidden nodes/layers. It should be noted that the CANFIS model can be viewed as a local-tuning RBFN (Radial Basis Function Network) model when the hidden layers of THEN-part MLPs are eliminated. Hence, the CANFIS model can be regarded as a generalized local-tuning neural network.

Its disadvantages might be slower learning due to architectural complexity and a requirement of larger training data, compared with a single MLP model. Therefore, if the task has a small limited number of training data, then an MLP model might be a better choice. Experimental results obtained with the CANFIS model are presented below in relation to a method for training a CANFIS neuro-fuzzy model for multi-illuminant color correction.

The CANFIS with linear rules model is equivalent to the well-known Takagi-Sugeno (also called "TSK" or "Sugeno-type") fuzzy inference model. In the field of control engineering, where a quick response is important, this TSK model is by far the most commonly used fuzzy system. The quickness comes from a computational advantage since implementation of linear rules is much simpler than implementation of nonlinear rules.

CANFIS modeling and CANFIS with linear rules are explained in detail at pages 369–400 and 572–592, of the text *Neuro-Fuzzy and Soft Computing, A Computational Approach to Learning and Machine Intelligence*, by Jyh-Shing Roger Jang, Chuen-Tsai Sun and Eiji Mizutani (co-inventor of the present application), Prentice Hall, Upper Saddle River, N.J. 07458, 1997, third printing, which pages and the figures therein are hereby incorporated by reference.

Method for Constructing Fuzzy Membership Functions for Multi-Illuminant Color Correction Using the CANFIS Neuro-Fuzzy Model Described Above.

Fuzzy Partitioning

In the CANFIS neuro-fuzzy model, fuzzy membership functions (MFs) partition the MF-input space into several local-expert's territories. Hence, data that come close to the center of a certain local-expert's area may not affect very much to the parameter-updatings of the other local experts. This local-tuning mechanism can make "local experts" learn locally optimal mainly for the vicinity of their own local regions.

Figure 9:
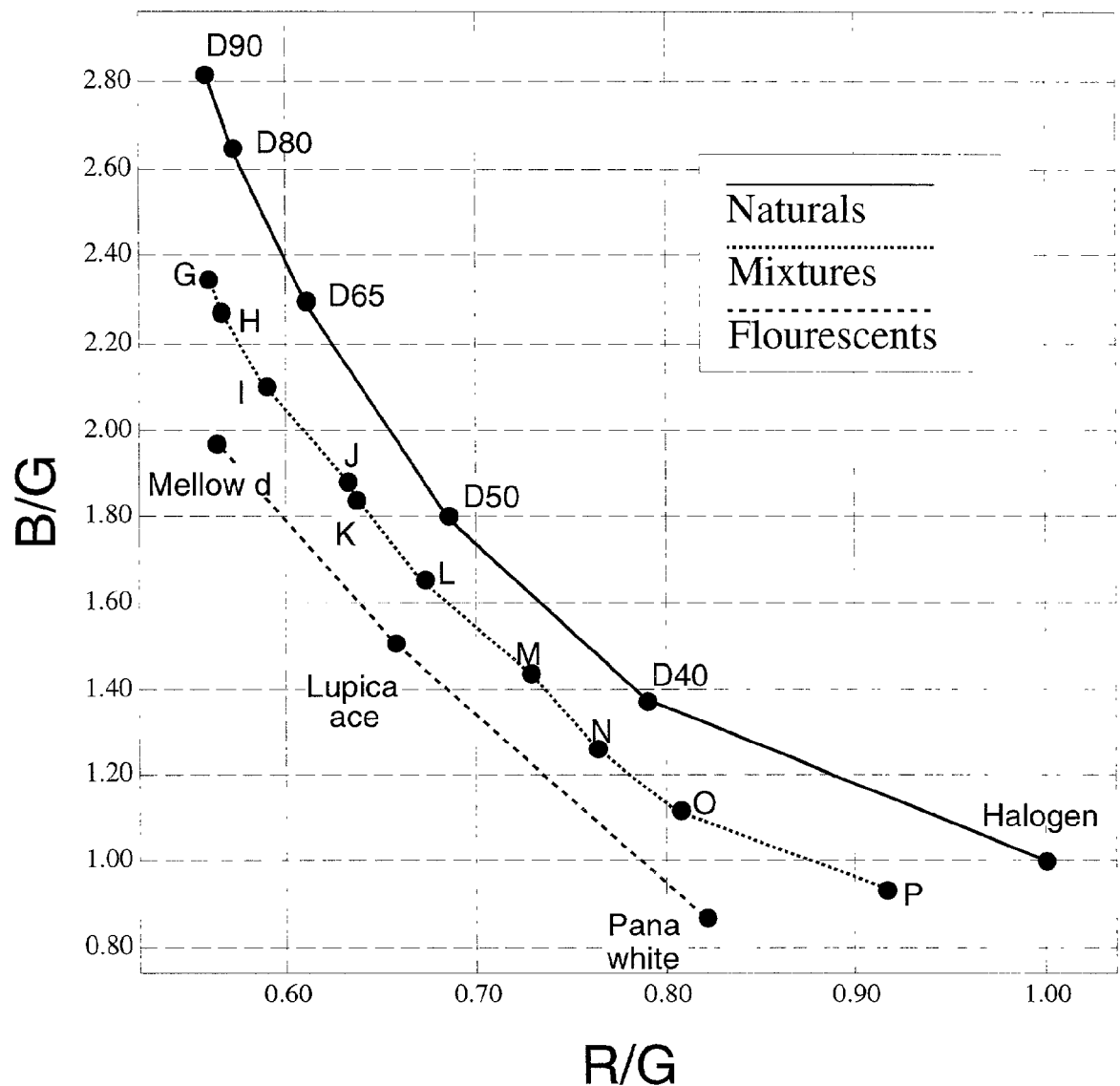
FIG. 9 is a graph which illustrates representative illuminants and related "natural" and "flourescent" curves.
Figure 10:
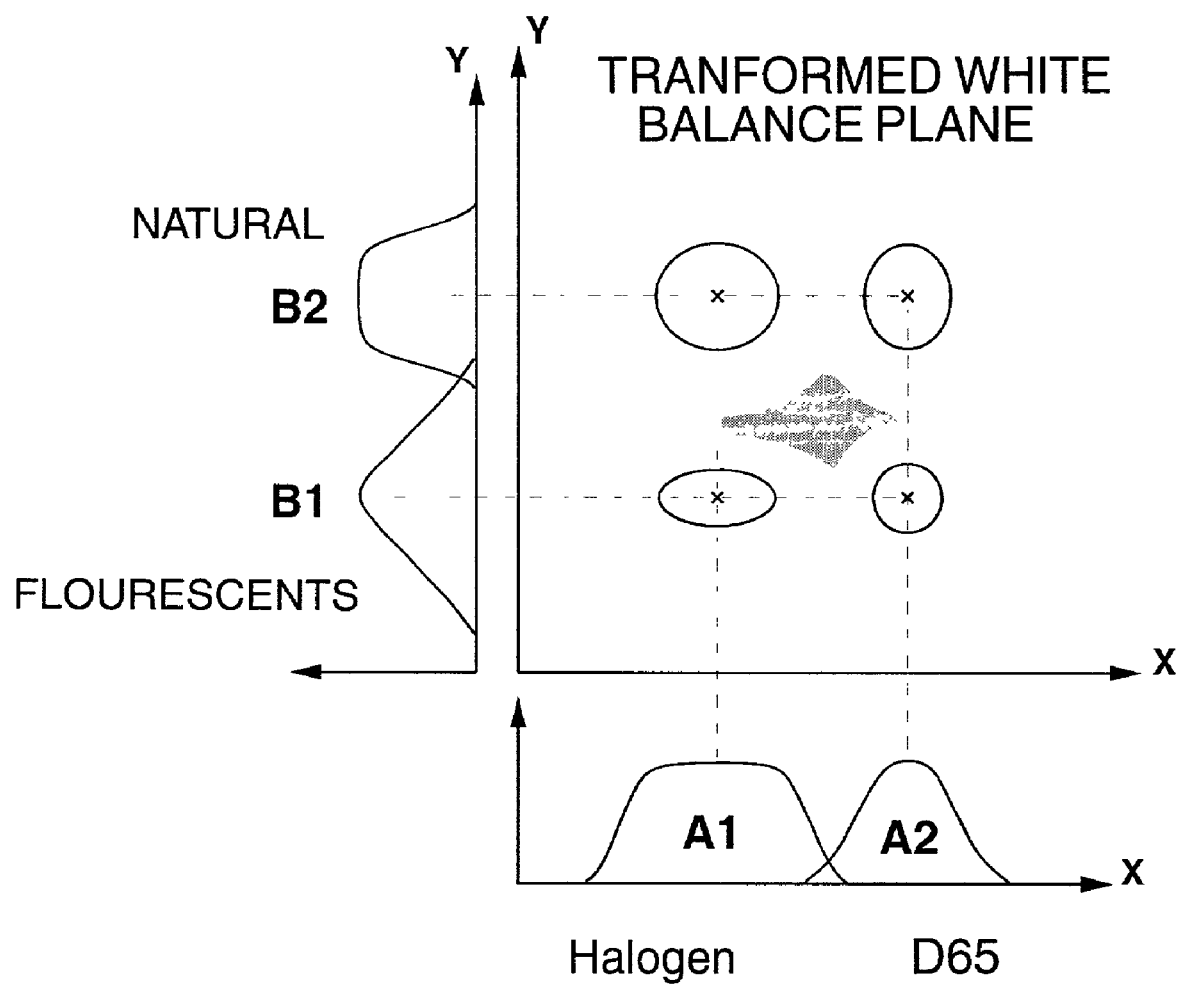
FIG. 10 is a graph which illustrates fuzzy partitioning by four bell-shaped membership functions on a transformed white balance plane.

For the multiple-illuminant problem as illustrated in FIG. 9, data in the halogen illuminant region should not make a significant impact on a local-expert MLP in the D90-illuminant region, which is at the other end of the "natural-illuminant" curve on the white balance plane. Those two extreme regions must be somehow distinguished by an appropriate partitioning. Fuzzy MFs plays an important role in partitioning the illuminant territories on the white balance plane in a "fuzzy" (but not "crisp") fashion, as illustrated in FIG. 10. In FIG. 10, two representative illuminants, halogen and D65, are chosen to determine the initial center positions of the two MFs on the X-axis, which corresponds to the "natural-illuminant" curve. This implies that the location along that curve is selected as an important feature in the task. The two linguistic labels "A1" and "A2" on the X-axis in FIG. 10 signify the respective "Halogen" and "D65" where:

The value/degree of A1-MF shows how close the illuminant is to the "Halogen" illuminant; and The value/degree of A2-MF shows how close the illuminant is to the "D65" illuminant.

Clearly, only one feature may not be sufficient for describing each illuminant's region appropriately. Another important feature is the distinction between the "natural" and the "fluorescent" illuminants. Therefore, two corresponding MFs (B1 for "fluorescent" and B2 for "natural") are constructed on the Y-axis to represent closeness to the fluorescent and natural illuminants, where:

The B1-MF value shows how close to the "fluorescent" illuminant-curve; and

The B2-MF value shows how close to the "natural" illuminant-curve.

In this way, each of mixed illuminants along the "mixtures" curve in FIG. 9 can be characterized by the degree of membership to the "natural" or "fluorescent" illuminant, as would be the case where an illuminant consisted of a 40% natural illuminant and a 60% fluorescent illuminant. In FIG. 9, "Lupica ace" refers to a trademark which identifies a "neutral" type of flourescent bulb sold in Japan by Mitsubishi Electric Co. of Tokyo, Japan. Since the X and Y axes in FIGS. 9 and 10 are not the same, a certain "nonlinear" coordinate transformation is needed. Such coordinate transformation is described below.

Nonlinear Coordinate Transformation on the White-Balance Plane

Figure 11:
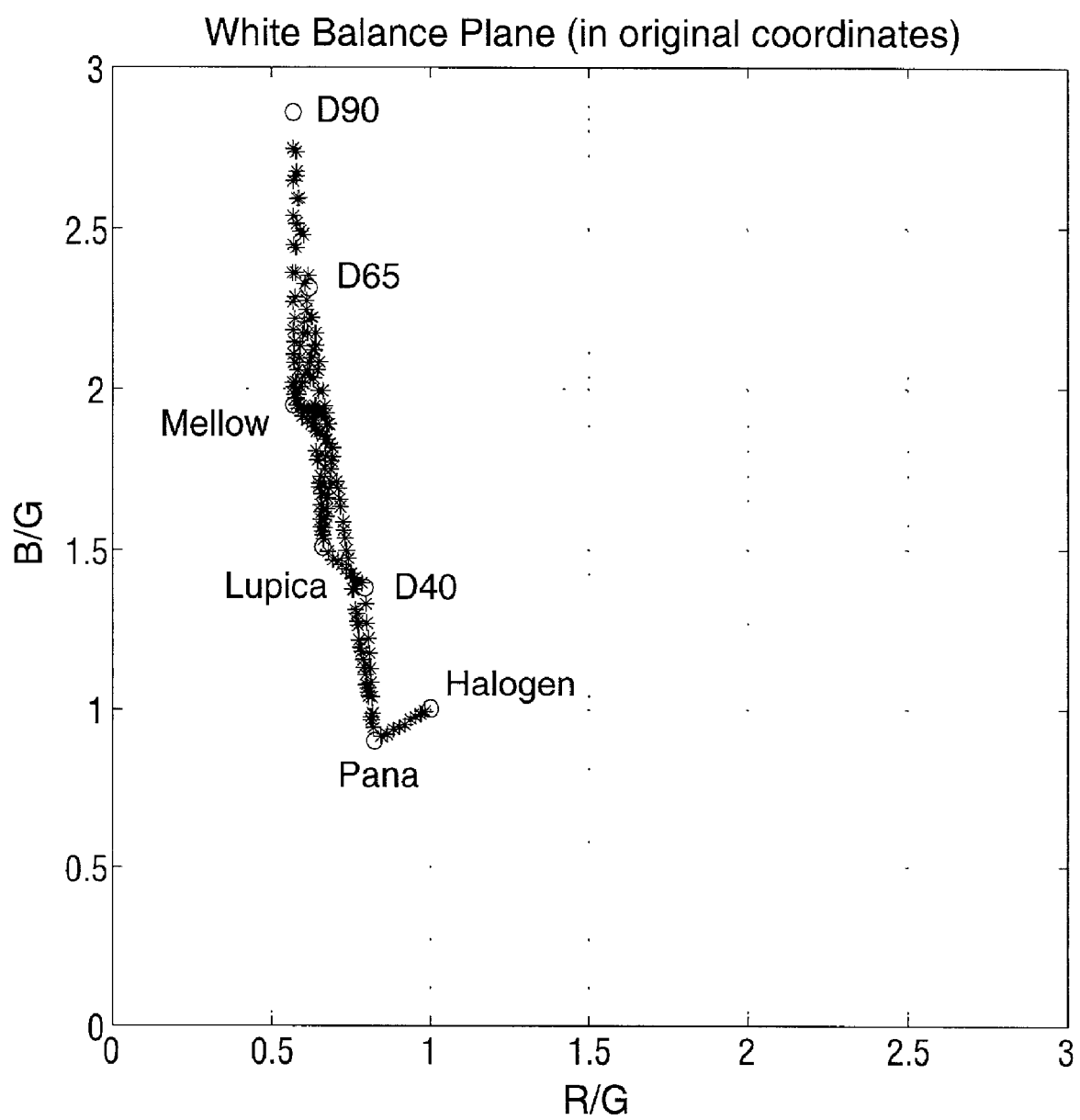
FIG. 11 illustrates a data distribution on original coordinates of a white balance plane.
Figure 12:
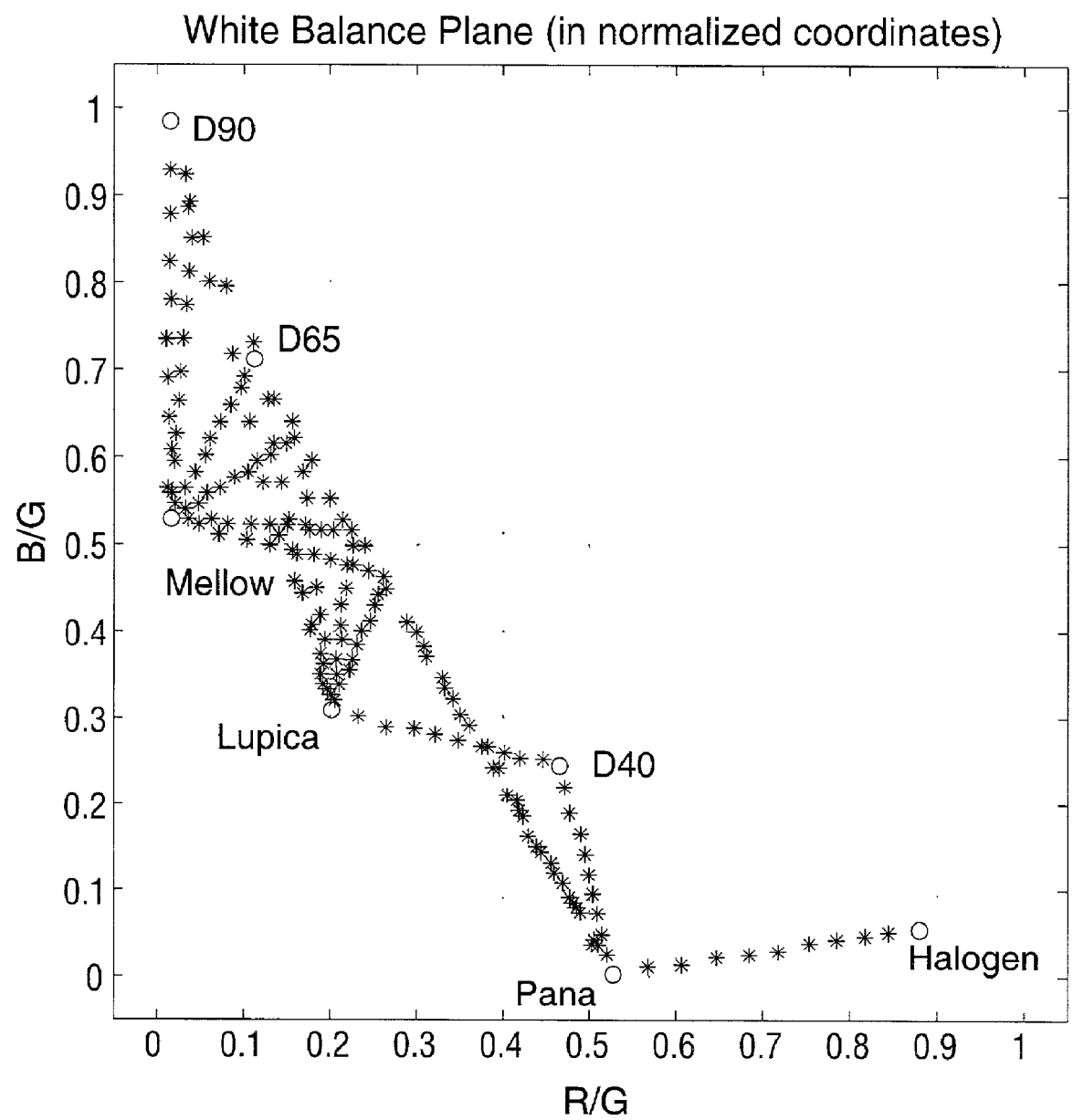
FIG. 12 illustrates a data distribution on normalized coordinates of the white balance plane.

FIG. 11 shows an actual data distribution of experimental data sets on the original R/G-B/G white balance plane. To conform FIG. 11 to FIG. 10, it is necessary to introduce an appropriate coordinate transformation. First, a simple linear-scaling is applied, resulting in FIG. 12. Then a neural network nonlinear coordinate transformation is applied, yielding FIG. 13, where FIG. 13 has Cartesian coordinates that match those of FIG. 10, although many other nonlinear transformations are possible.

The importance of nonlinear coordinate transformation cannot be overemphasized because it allows simple "grid" partitionings. There are several advantages over "scatter" partitionings as are typically formed by a radial basis function network ("RBFN"). RBFNs are explained in detail at pages 238–246 and 369–400, and in particular, at FIG. 13.3 on page 373 of said text *Neuro-Fuzzy and Soft Computing, A Computational Approach to Learning and Machine Intelligence*, which pages and the figures therein are hereby incorporated by reference.

In further detail, nonlinear coordinate transformation provides the following advantages:

1. Linguistic interpretability can be kept sufficiently high to match our intuitive understandings; and
2. The required number of (basis) functions can be reduced.

Advantage #1 insinuates that clear linguistic labels may not be readily put on each MF in the case of scatter or tree partitionings. Advantage #2 indicates, for instance, that in order to form nine local regions on the X-Y plane, the RBFN needs nine basis functions, whereas the CANFIS model requires six MFs (three MFs for each axis). Accordingly, the total number of function parameters differs. Further detail regarding partitioning is taught at pages 86 and 87 of said *Neuro-Fuzzy and Soft Computing, A Computational*

*Approach to Learning and Machine Intelligence*, which pages and the figures therein are hereby incorporated by reference.

Method for Training a CANFIS Neuro-Fuzzy Model for Multi-Illuminant Color Correction.

Many nonlinear optimization algorithms can be employed for training the CANFIS neuro-fuzzy model described above in relation to a multi-illuminant color correcting using a CANFIS neuro-fuzzy model. The model consists of two major parameterized constituents:

(1) "fuzzy MFs (IF-part);" and
(2) "local-expert MLPs (THEN-part),"

as illustrated in FIG. 8. There are many possibilities in applying optimization algorithms to update the parameters of these two constituents, for example:

(Method A) Apply the same optimization algorithm to both IF-part MFs and THEN-part MLPs; or
(Method B) Apply different optimization algorithms to IF-part MFs and THEN-part MLPs.

These methods can be implemented in either a system-wise or a component-wise manner. For system-wise training, all components, MFs and MLPs, of the CANFIS neuro-fuzzy model are trained simultaneously as a system, whose final output is computed by the above equation for the value of A as set forth above. For component-wise training, each MF or MLP is tuned/trained independently, and then all the components are put together to form the CANFIS neuro-fuzzy model, whose final output is computed by the above equation for the value of A as set forth above.

To be more specific by referring to FIG. 8, in the component-wise manner, each local expert MLP is usually trained to produce the desired final output vector A (i.e., X, Y, Z) as the output vector $O_i$. On the other hand, in the system-wise training manner, the final output vector A (as set forth above) is attempted to be made to match the desired triplet X, Y and Z, but each local expert MLP's output vector $O_i$ may not be necessarily close to it; that is, each output vector $O_i$ may not be interpretable. In FIG. 8, the three output nodes of each local expert MLP are tagged by X, Y and Z, merely for the purpose of showing which node is related to which signal.

Furthermore, there are three different parameter-updating modes, depending on treatment of training data:

(1) online pattern-by-pattern updating mode;
(2) block-by-block updating mode; and
(3) batch updating mode.

Therefore, there are many possible applications of any optimization algorithms to the CANFIS model. It is worth noting, however, that regardless of whether Method A or Method B is utilized, the component-wise training is questionable in obtaining highly accurate results because local-expert MLPs' outputs are optimized independently of the firing strengths of fuzzy MFs in spite of the dependence expressed in the above equation for the value of A as set forth above. Thus, the other system-wise training is of much greater practical importance, especially when the CANFIS model needs to produce very accurate input/output mappings, as required in color correction of color images.

In general, an important observation can be made in neuro-fuzzy systems that the parameters of MLPs are far from optimal values, compared with those of MFs, because the initial parameters of fuzzy MFs are determined based on problem-specific knowledge, whereas the initial parameters of local-expert MLPs are randomly initialized. Therefore, application of different optimization algorithms to MFs and MLPs (i.e., implementation of Method B) is possible; in particular, application of a faster algorithm to MLPs and a slower algorithm to MFs. A typical demonstration in this spirit is the hybrid-learning of ANFIS (i.e., single-output CANFIS with linear rules model), a combination of fast "linear" least squares and a slow steepest descent-type method, although it is restricted to "linear" consequent fuzzy systems. Such hybrid-learning is detailed at pages 219–220 and 222–223 of said text *Neuro-Fuzzy and Soft Computing, A Computational Approach to Learning and Machine Intelligence*, supra, which pages and the figures therein are hereby incorporated by reference.

Method A in the system-wise training manner can be considered in the same spirit for the CANFIS with neural rules model; for instance, by applying the steepest descent-type method to MFs in the "batch" mode and it to MLPs in the "online pattern-by-pattern" mode. This strategy can be improved in conjunction with a simple heuristic rule; for instance:

Rule: Fix the parameters of fuzzy MFs at an early stage of training phase.

Table 2 shows four representative results obtained with MLP and CANFIS models, when the checking error was minimized or at the preset limit iteration of 2,000,000. The column "# of Para." refers to the number of parameters and "RMSE" refers to the root mean squared error. The columns labelled "# of bad samples" are most important, denoting the number of color samples whose color differences were greater than the upper-limit threshold value (set equal to 10). All of the four models were trained by using the widely-employed steepest descent-type method in the online pattern-by-pattern updating mode.

TABLE 2

| Exp. # | Structure | # of Para. | Stopped epoch | Training XYZ-RMSE | Average color diff. | # of bad samples | Checking XYZ-RMSE | Average color diff. | # of bad samples |
| --- | --- | --- | --- | --- | --- | --- | --- | --- | --- |
| 1 | 5 × 22 × 3 MLP | 201 | 148,500 | 0.006176 | 3.09685 | 13 | 0.005781 | 2.88622 | 52 |
| 2 | 5 × 45 × 3 MLP | 408 | 347,500 | 0.005044 | 2.57207 | 11 | 0.004601 | 2.29206 | 39 |
| 3 | CANFIS (HU = 10) | 304 | 2,000,000 | 0.006356 | 2.85213 | 7 | 0.006688 | 2.80347 | 35 |
| 4 | CANFIS (HU = 10) | 304 | 1,771,000 | 0.005476 | 2.52347 | 0 | 0.005542 | 2.44866 | 0 |

The results in Experiment #4 were obtained by using the following heuristic rule:

Rule: Start updating the parameters of fuzzy MFs after 500,000 epochs.

Selection of Output Color Space

In the present disclosure, XYZ space is mainly used as an output color space of color correction models. As described earlier herein, the output color space can also be L*a*b* or XnYnZn (normalized XYZ space) for device-independent color correction. For device-specific color correction, it can be any color space that the color imaging device subject to the color correction outputs, or can even be a color space arbitrarily defined according to a user's specific requirement. The change of output color space can be achieved by simply replacing the target output data for color correction model's training data set.

As discussed above in relation to Illuminant dependency, an electronic camera's output values are white-balanced to keep R=G=B at illuminant color. XnYnZn and L*a*b* color spaces also have a similar operation in their definition, wherein tri-stimulus values are normalized by values for illuminant color. Such a color space can be denoted as a normalized color space. This operation represents the human eye's chromatic adaptation.

Figure 1:
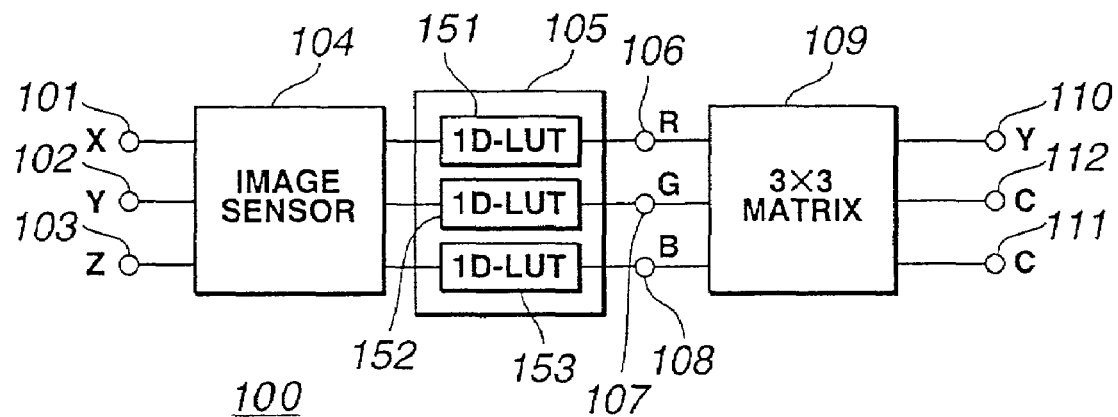
FIG. 1 is a block diagram of a signal processor used in both image scanners and electronic color cameras.
Figure 2:
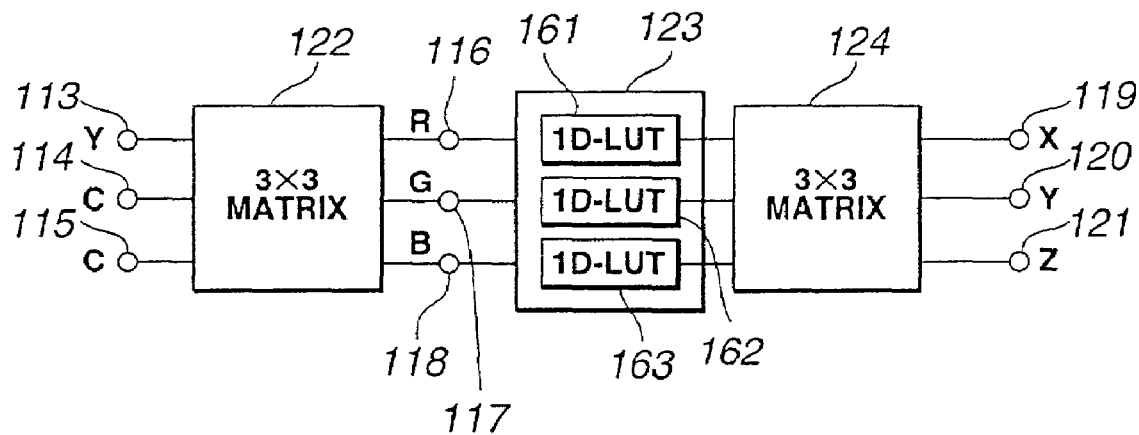
FIG. 2 is a reverse signal processor for use in connection with the signal processor of FIG. 1.
Figure 3:
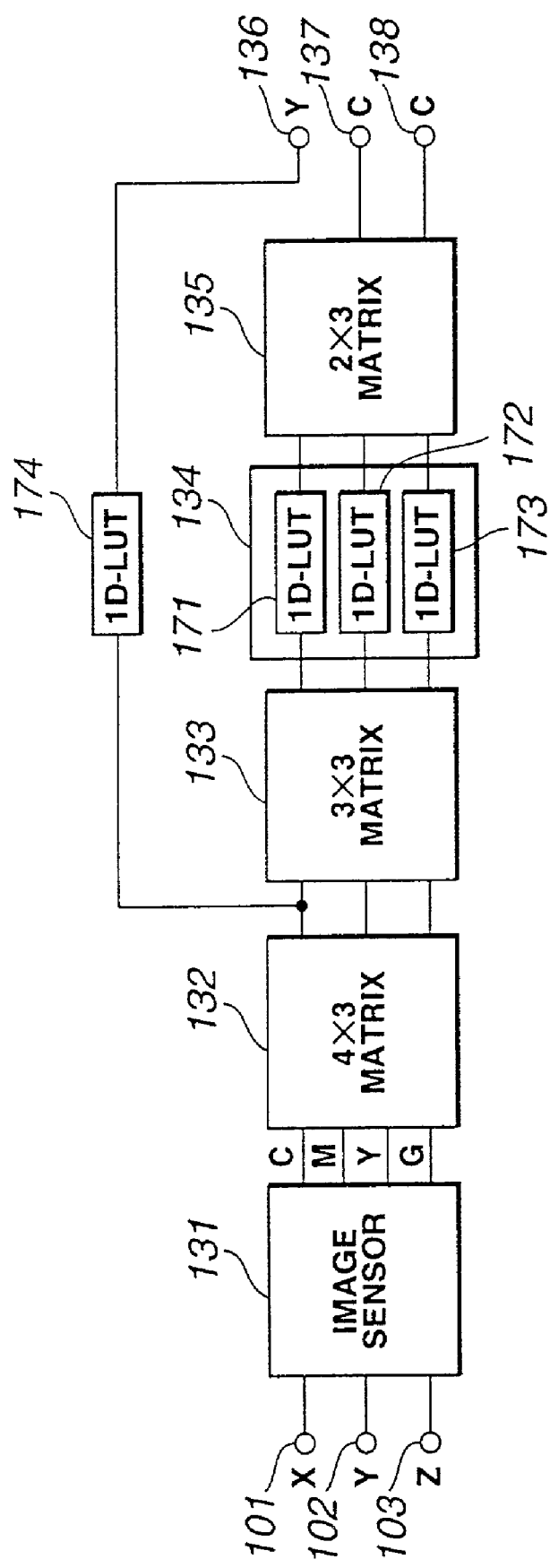
FIG. 3 is a block diagram of a signal processor typically used in a complementary color electronic camera.

As shown in FIG. 1, an electronic camera's output values are based on gamma-corrected RGB. Similar operations are found in the definition of L*a*b* color space, and such a color spaces can be considered to be a nonlinear color space. The nonlinear mapping is for a correlation with lightness (a measure for human's luminance perception), to better describe perceived color by human eyes rather than the physical property of color.

A non-normalized linear color space, such as XYZ, can provide an advantage when used as a multi-illuminant color correction model's output color space. An image captured by an electronic camera may have incorrect white point, due to incorrect estimation of illumination automatically made on the camera. For such a case, white point correction can be readily made off the camera after capturing the image, if the color correction model's output space is XYZ. If the output space is a nonlinear color space, white point correction is more complicated because the output data has to be once brought into a linear space to perform the white point correction.

It can be assumed that an electronic camera's color transformation is a function of its white-balance setting, as described above in relation to Illuminant dependency. No matter how correct or incorrect the on-camera estimation of illumination is, the camera's color transformation can be uniquely determined by referring to the camera's white-balance information, R/G and B/G for instance. Therefore, XYZ values that output from a multi-illuminant color correction model can well describe the original color's physical property, even if the input image's white point is incorrect. When a user determines that the white point is incorrect in an image taken by an electronic camera, the user can first output image data in XYZ from the multi-illuminant color correction model, then can re-estimate the image's illumination using a sophisticated method, which is too computationally expensive to be performed on-camera. The method can provide accuracy not only in white point, but also in color distributed around the re-balanced white point, because the re-balancing is applied to image data in corrected color space. A non-normalized linear color space can also be a space formed at an image sensor's output (raw image data).

Color Constancy

It is known that many users prefer an electronic camera that reproduces color as if images were captured under one fixed standard illuminant such as D50 (specified by CIE, 5000K daylight), no matter what illuminant is actually used at the image capturing. This is referred to as "color constancy" color reproduction. By appropriately modifying the training data set of the above described multi-illuminant color correction model using either an MLP or a CANFIS neuro-fuzzy architecture, the above described "color-constancy" color correction is easily accomplished.

It is to be understood that although an MLP is described as one example of a neural network which is applicable to the present invention, other types of neural networks such as a radial basis function network ("RBFN") or a modular neural network may also be utilized.

It is to be further understood that each embodiment of the present invention may be implemented as software to be run on a computer or may be implemented as a function of image processing software run on a computer. In such an instance, image data files may be opened by the software, and any embodiment of the present invention may be applied to image data, such as a JPEG, GIF or BMP format file to allow color correction to be applied to such image data.

It is additionally to be understood that the methods and apparatus of the present invention may be applied to characterize a component in a color imaging device, such as an image sensor in an electronic camera. It is to be further understood that such characterization may be employed to correct for undesired qualities of such image sensor.

Although only certain embodiments have been described in detail, those having ordinary skill in the art will certainly understand that many modifications are possible without departing from the teachings hereof. All such modifications are intended to be encompassed within the following claims.

We claim:

1. A method of correcting color of a color image obtained by an electronic camera, comprising the steps of:
   determining, using a neural network, a correction to data representative of the color image based upon an estimated illuminant of the color image; and
   applying the correction to the data representative of the color image, wherein the illuminant comprises multiple sources of illumination including the camera's on-camera R/G and B/G illumination estimation data wherein R, G and B are measured signal values for illumination color;
   recording the data representative of the image with data representative of the estimated illuminant; and
   transmitting the data representative of the image with the data representative of the estimated illuminant.

2. The method of claim 1, wherein the electronic camera captures at least one still image.

3. The method of claim 1, wherein the electronic camera captures a succession of moving images.

4. An apparatus for correcting color of a color image obtained by an electronic camera, comprising:
   a neural network for determining a correction to data representative of the color image based upon an estimated illuminant of the color image and for applying the correction to the data representative of the color image, wherein the illuminant comprises multiple sources of illumination including the camera's on-camera R/G and B/G illumination estimation data wherein R, G and B are measured signal values for illumination color;
   a device capable of recording the data representative of the image with data representative of the estimated illuminant; and
   a device capable of transmitting the data representative of the image data with the data representative of the estimated illuminant.

5. The apparatus of claim 4, wherein the electronic camera captures at least one still image.

6. The apparatus of claim 4, wherein the electronic camera captures a succession of moving images.

7. A computer readable recording medium for use with a computer having recorded thereon a computer program for correcting color data of a color image obtained by an electronic camera, the computer program comprising instructions to:
   determine, using a neural network, a correction to data representative of the color image based upon an estimated illuminant of the color image;
   apply the correction to the data representative of the color image, wherein the illuminant comprises multiple sources of illumination including the camera's on-camera R/G and B/G illumination estimation data wherein R, G and B are measured signal values for illumination color;
   record data representative of the corrected data; and
   transmit the data representative of the image with the data representative of the estimated illuminant.

8. The computer readable recording medium of claim 7, wherein the electronic camera captures at least one still image.

9. The computer readable recording medium of claim 7, wherein the electronic camera captures a succession of moving images.

10. A method of transmitting color corrected data of a color image obtained by an electronic camera, comprising the steps of:
   determining, using a neural network, a correction to data representative of the color image based upon an estimated illuminant of the color image;
   applying the correction to the data representative of the color image, wherein the illuminant comprises multiple sources of illumination including the camera's on-camera R/G and B/G illumination estimation data wherein R, G and B are measured signal values for illumination color;
   recording data representative of the image with the data representative of the estimated illuminant; and
   transmitting data representative of the corrected data.

11. The method of claim 10, wherein the electronic camera captures at least one still image.

12. The method of claim 10, wherein the electronic camera captures a succession of moving images.

13. The method of claim 1, wherein the data representative of the color image includes information regarding the illuminant.

14. The apparatus of claim 4, wherein the data representative of the color image includes information regarding the illuminant.

15. A method of recording image data obtained by an electronic camera, comprising the steps of:
   capturing a color image and generating data representative of the image;
   estimating an illuminant for the captured color image and generating data representative of the estimated illuminant wherein the illuminant comprises multiple sources of illumination that includes the camera's on-camera R/G and B/G illumination estimation data wherein R, G and B are measured signal values for illumination color;
   recording the data representative of the image with the data representative of the estimated illuminant; and
   transmitting the data representative of the image with the data representative of the estimated illuminant.

* * * * *